No. 862,229. PATENTED AUG. 6, 1907.
W. P. WYNNE & J. H. GRANT.
FURNACE FOR THE TREATMENT OF REFRACTORY ORES.
APPLICATION FILED DEC. 19, 1904.
Fig-1-
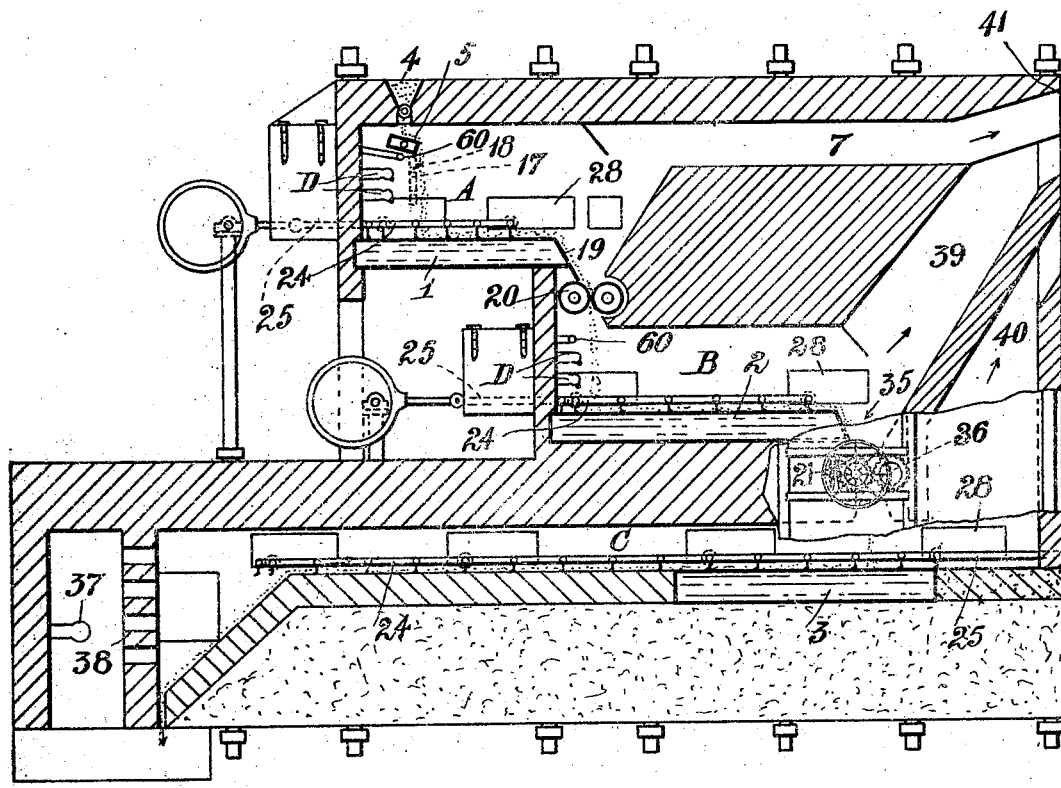
Fig-2-
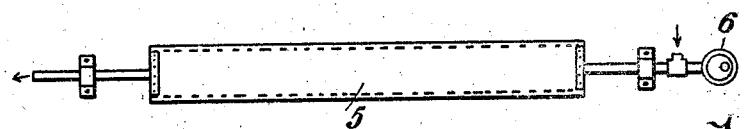
Witnesses
William Thomas Harris
Walter Charles Hart
Inventors
Walter Palmer Wynne
James Henry Grant
by Edw. Waters & Son.
Attorneys

UNITED STATES PATENT OFFICE.

WALTER PALMER WYNNE AND JAMES HENRY GRANT, OF BALLARAT, VICTORIA, AUSTRALIA.

FURNACE FOR THE TREATMENT OF REFRACTORY ORES.

No. 862,229.   Specification of Letters Patent.   Patented Aug. 6, 1907.

Application filed December 19, 1904. Serial No. 237,506.

*To all whom it may concern:*

Be it known that we, WALTER PALMER WYNNE and JAMES HENRY GRANT, both subjects of the King of Great Britain, residing at No. 11 Australian Mutual Provident Buildings, Lydiard street, Ballarat, in the State of Victoria, Australia, consulting engineers, have invented an Improved Furnace for the Treatment of Antimony-Gold Ores and other Refractory Ores, of which the following is a specification.

This invention relates to a furnace for the treatment of antimony-gold ores, pyrites and other refractory ores, wherein the antimony is volatilized and driven from the ore with other fumes and collected in the form of oxid of antimony in a surface condenser, and the object in view is to instantaneously cool the ore after passing through the flames of the furnace and so prevent said ore from sintering or fusing into a mass of clinkers, a condition which would be unsuitable for further treatment and fatal to the extraction of the gold. To this end the hearths are hollow and are continuously supplied by cold fluid hence the particles of ore falling thereon are instantly cooled below the fusing point as they accumulate and so can be gradually moved forward by the rabbles from one hearth to the other.

The invention is illustrated by the annexed drawings whereof,

Figure 1 is a vertical section of the furnace with parts in elevation and the condenser omitted. Fig. 2 is an enlarged plan of the ore distributer.

Referring to these drawings it will be observed that there are three furnaces A, B, C, situate at different elevations and so arranged that the material is fed successively from the upper A to the middle B and to the lower C by means of rabbles.

The hearths 1 and 2 are formed of hollow iron and are continuously supplied by cold fluid and one end of the finishing hearth 3 is similarly constructed, but the discharge end is kept at a temperature about three times as great as that of the rear or fluid cooled end.

The powdered ore is first fed from a hopper 4 on to an inclined reciprocating fluid cooled distributer 5 mounted on a hollow shaft above the hearth 1 of the furnace A said distributer being operated by an eccentric 6 (Fig. 2). As the ore falls from the distributer it is blown by an air blast 60 so that it falls in the form of a spray through the flat sheets of flame emitted from two oil or gas burners D which produce a heat at about 450 degrees Fahrenheit and drive-off the volatile constituents of the ore which are carried away by a flue 7 to the usual surface condenser (not shown).

Although the heat of the furnace is much above the fusing point of antimony, fusion does not take place as each particle when passing through the flames is separate and consequently surrounded by air, and the object of the fluid cooled hearth is to instantly cool each particle of the ore below its fusing point so that when said particles accumulate on the hearth they may not sinter or fuse into a mass unsuitable for further treatment.

The burners may have a baffle plate 17 in front with horizontal slits 18 therein for the emission of the flames, as shown by dotted lines in Fig. 1.

The ore is gradually moved forward along to the end of the hearth 1 by means of reciprocating fluid cooled rabbles 24 and falls down a chute 19 between rotating grinding rollers 20 and passes to another furnace B situate beneath and in advance of the furnace A. The grinding rollers 20 are kept in contact with each other by a spring 21 which will yield under undue pressure, and they are operated by spur gearing as shown in Fig. 1. The rabbles are reciprocated by an eccentric or the like connected thereto by a pipe 25 and ports 28 are provided in the sides of the furnace for inspection or cleaning purposes.

Each hearth has a similar rabble and the ore is fed from the second hearth B through a chute 35 to grinding rollers 36 on to the fluid cooled end of the finishing hearth 3. This latter hearth is comparatively long and is heated for the most part to a high temperature by oil or other burners 37 having a perforated baffle plate 38 in the front thereof or by any suitable furnace.

The hearths 2 and 3 of the furnaces B and C have independent flues 39 and 40 respectively leading with the flue 7 of the furnace A to the surface condenser where the volatile fumes are converted into oxid of antimony.

The fluid cooled hearths herein described must not be confused with the water jackets of an ordinary smelting furnace as the former are employed for the instantaneous cooling of the antimony ore while the object of the latter is to protect the sides of the furnace from the intense heat necessary for the smelting of ores such as silver, lead or copper.

Having now particularly described and ascertained the nature of our said invention and in what manner the same is to be performed we declare that what we claim is:

1. An improved furnace for the treatment of antimony gold ores and other refractory ores comprising a plurality of furnaces situated at different elevations and provided with fluid cooled hearths and separate flues and means for feeding the material successively from one furnace to the other substantially as set forth.

2. In a furnace for the treatment of antimony gold ores and other refractory ores. a fluid cooled reciprocating ore distributer situated above the burners of the furnace and an air blast between said burners and said distributer in combination with a fluid cooled hearth substantially as set forth.

3. Improved furnace for the treatment of antimony gold ore and other refractory ores comprising a plurality of furnaces with fluid cooled hearths situate at different elevations; the top one having a feed hopper above the hearth, a hollow fluid cooled reciprocating distributer, an air blast beneath the latter and two burners, a reciprocating rabble, a chute at the end of the hearth a pair of grinding rollers, through which the material falls to the middle furnace similarly constructed, a finishing hearth beneath which is cooled at its rear end and provided with a similar rabble and with a burner at its discharge end and a perforated baffle plate in the front thereof, separate flues leading from each furnace to a surface condenser substantially as set forth.

In testimony whereof we have hereunto set our hands in presence of two subscribing witnesses.

WALTER PALMER WYNNE.
JAMES HENRY GRANT.

Witnesses:
EDWARD NEEDHAM WATERS,
WALKER CHARLES HART.